W. T. ANDERSON, Jr.
BURGLAR ALARM.
APPLICATION FILED APR. 29, 1908.
918,413. Patented Apr. 13, 1909.
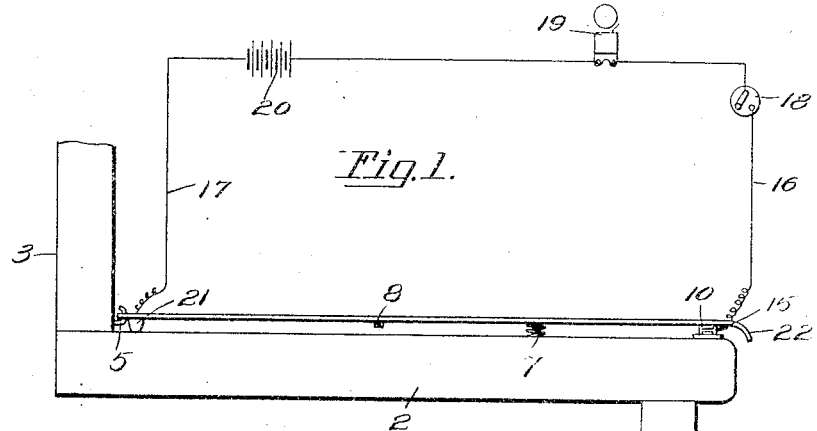
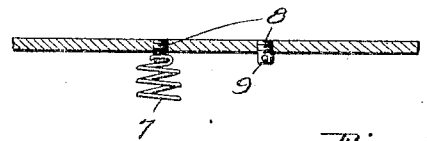
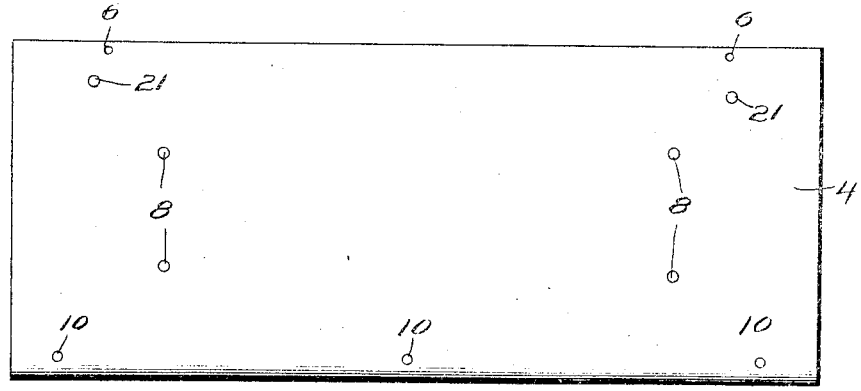
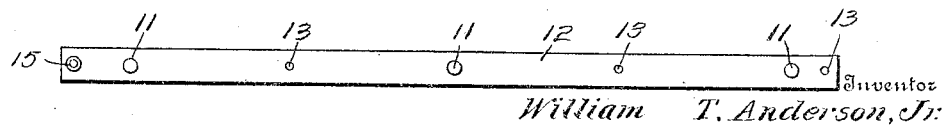
Inventor
William T. Anderson, Jr.
Witnesses
F. C. Gibson.
John F. Byrne.
By Victor J. Evans
Attorney

UNITED STATES PATENT OFFICE.

WILLIAM T. ANDERSON, JR., OF TARENTUM, PENNSYLVANIA.

BURGLAR-ALARM.

No. 918,413.

Specification of Letters Patent.

Patented April 13, 1909.

Application filed April 29, 1908. Serial No. 429,901.

*To all whom it may concern:*

Be it known that I, WILLIAM T. ANDERSON, Jr., a citizen of the United States of America, residing at Tarentum, in the county of Allegheny and State of Pennsylvania, have invented new and useful Improvements in Burglar-Alarms, of which the following is a specification.

My invention relates to burglar alarms, and its primary object is the provision of a simple, durable and efficient device of this character, which is especially designed for application to a stairs, and which can be readily and quickly applied by an unskilled person.

A further object of my invention is the provision of a burglar alarm which can be manufactured and sold at a comparatively low cost.

With the above and other objects in view, the invention consists in the construction, combination and arrangement of parts hereinafter fully described, claimed and illustrated in the accompanying drawing, wherein:

Figure 1 is a view in side elevation illustrating the application of my improved burglar alarm. Fig. 2 is a detail plan view of the tread plate. Fig. 3 is a detail top plan view of the contact strip, and Fig. 4 is a sectional view illustrating the manner in which the supporting springs are secured to the tread plate.

Referring to the drawing by reference numerals, 1 designates the tread, and 3 the riser of a stairs.

My improved burglar alarm comprises a tread plate 4 which is secured over the tread 2 of the stairs by means of a plurality of screw hooks 5 or other suitable fastening elements. The screw hooks 5 are let into the base of the riser 3 above the tread 2 and are received by openings 6 in the tread plate 4. The connection between the tread plate 4 and the elements 5 is such that the plate is pivotally mounted at its inner edge above the tread of the stairs. The outer or free end of the tread plate 4 is supported by means of expansible coiled springs 7 which are arranged on opposite sides of the transverse center of the plate. The springs 7 are secured in applied position by means of bolts 8 which are threaded into the tread plate and which are provided with openings 9 for the reception of the upper ends of the springs, as fully illustrated in Fig. 4 of the drawing. A pair of the bolts 8 is arranged on each side of the transverse center of the tread plate and the bolts of each pair are relatively spaced. The free end of the tread plate 4 is provided on its underside with contacts 10, which are preferably constructed of platinum. The contacts 10 are adapted when the tread plate is depressed to engage contacts 11 on a contact strip 12 which is secured to the tread 2 of the stairs. The plate 12 is provided with perforations 13 for the passage of fastening elements and with a binding post 15 to which the wire 16 of an electric circuit is secured. The wire 17 of the circuit is secured to the tread plate. A switch 18 and a bell 19 are included in the circuit, and the said circuit is energized by a dry battery 20. The inner or pivoted end of the tread plate is supported above the tread 2 of the stairs by means of fulcrum blocks 21 which are screwed into the underside of the plate. The outer or free end of the tread plate is curved downwardly, as at 22, over the outer edge of the tread. The curved portion of the tread plate prevents the edge of the plate from being contacted with by the feet of a person ascending the stairs.

In practice, three of the burglar alarms are used, and are preferably secured to the first three treads of the stairs. The wires 17, 16 and battery 20 are concealed and the bell and switch are located at a convenient point. The switch 18 enables the device to be thrown into and out of use. When a person steps on the tread plate 4 the free end thereof is moved downwardly under the tension of the spring 7, resulting in the closing of the circuit and the sounding of the bell. When the person steps off of the tread plate the spring 7 returns the free end thereof to its normal position, resulting in the breaking of the circuit. The tension of the springs can be regulated by moving each spring from one of each pair of bolts to the other. The tread plate is preferably as large as the surface of the tread 2 and it does not in any way hinder the laying of or mar the appearance of the stair carpet.

From the foregoing description taken in connection with the accompanying drawing, the construction and mode of operation of the invention should be understood without a further extended description.

Changes in the form, proportions and minor details of construction may be made within the scope of the claims without departing from the spirit or sacrificing any of the advantages of the invention.

Having fully described and illustrated my invention, what I claim is:

1. The combination with the tread and riser of a stairs, of a tread plate pivotally secured to the riser and extending over the tread of the stairs, a fulcrum block secured to the tread plate to support its pivoted end, a spring secured to the tread plate to support its free end, a contact strip secured to the tread, a contact secured to the strip, and a contact secured to the tread plate.

2. The combination with the tread and riser of a stairs, of a tread plate pivotally secured to the riser and extending over the tread, the free end of the plate being curved downwardly over the outer edge of the tread, a fulcrum block secured to the tread plate to support its pivoted end, a bolt removably secured to the tread plate, a spring secured to the bolt to support the free end of the tread plate, a contact strip secured to the tread, a contact secured to the strip, and a contact secured to the tread plate.

3. A burglar alarm including a pivotally mounted tread plate, a fulcrum block adapted to support the pivoted end of the tread plate, a spring adapted to support the free end of the tread plate, a contact, and another contact secured to the tread plate.

4. A burglar alarm comprising a pivotally mounted tread plate, a fulcrum adapted to support the pivoted end of the tread plate, a bolt removably secured to the tread plate, a spring secured to the bolt and adapted to support the free end of the tread plate, a contact strip, a contact secured to the strip, and a contact secured to the tread plate.

In testimony whereof I affix my signature in presence of two witnesses.

WILLIAM T. ANDERSON, JUNIOR.

Witnesses:
CARL FRIEDRICH,
C. E. KING.